United States Patent [19]

Jolissaint

[11] Patent Number: 4,494,229
[45] Date of Patent: Jan. 15, 1985

[54] INTERCONNECTING APPARATUS FOR A DISTRIBUTED SWITCHING TELEPHONE SYSTEM

[75] Inventor: Charles H. Jolissaint, Sunnyvale, Calif.

[73] Assignee: Rolm Corporation, Santa Clara, Calif.

[21] Appl. No.: 331,383

[22] Filed: Dec. 16, 1981

Related U.S. Application Data

[63] Continuation of Ser. No. 054,008, Jul. 2, 1979, abandoned.

[51] Int. Cl.³ .............................................. H04Q 11/04
[52] U.S. Cl. ..................................................... 370/58
[58] Field of Search .................... 370/58, 56, 88, 67; 179/18 FC

[56] References Cited

U.S. PATENT DOCUMENTS

| | | | |
|---|---|---|---|
| 3,280,263 | 10/1966 | Von Sanden | 370/67 |
| 3,514,541 | 5/1970 | Inose et al. | 370/56 |
| 3,522,381 | 7/1970 | Feder | 370/56 |
| 3,529,089 | 9/1970 | Davis | 370/56 |
| 3,652,798 | 3/1972 | McNeilly et al. | 370/88 |
| 3,859,468 | 1/1975 | Smith | 370/88 |
| 4,042,780 | 8/1977 | Wolters | 370/88 |
| 4,190,821 | 2/1980 | Woodward | 370/88 |

Primary Examiner—Douglas W. Olms
Attorney, Agent, or Firm—Blakely, Sokoloff, Taylor & Zafman

[57] ABSTRACT

An apparatus for interconnecting switching modules, such as PBXs, of the time division multiplexing type is disclosed. An intertie termination unit is employed which allows signals to be effectively routed through the modules without using the primary TDM bus within the modules. The modules are interconnected in a carousel arrangement which provides substantial economic and reliability advantages over hierarchical architecture and over systems employing a combination of direct links and buses.

8 Claims, 10 Drawing Figures

INTERCONNECTING APPARATUS FOR A DISTRIBUTED SWITCHING TELEPHONE SYSTEM

This is a continuation of application Ser. No. 054,008, filed July 2, 1979 now abandoned.

BACKGROUND OF THE INVENTION

1. Field of the Invention

The invention relates to time division multiplexed switching systems.

2. Prior Art

Time division multiplexed switching systems, including those which operate under the control of digital computers, are very well-known and widely used. For a discussion of time division multiplexed systems, see U.S. Pat. Nos. 3,115,552; 3,172,956; and 3,401,235.

In some cases, time division multiplexing of telephone signals is incorporated into switching devices such as private branch exchanges (PBXs). These devices interconnect with all classes of trunk lines, station lines and other lines to switch between lines and to concentrate signals on these lines to trunk lines connected to the public network. This permits efficient utilization of these public network access trunk lines. Numerous commercial systems are available, including those which employ redundant computers to provide high reliability in such telephone switches. One such time division multiplexed switching device shall be described in conjunction with FIG. 6. Typically, these devices include, as will be described, an interface unit (comprising answering supervision, analog-to-digital and digital-to-analog conversion), concentration unit, and switching means. Hereinafter for purposes of this application, these types of devices and related devices shall be referred to as "modules" or "switching modules".

To expand the capacity of these modules, particularly PBXs, switching and concentrating units are interconnected most often in a multi-stage hierarchical architecture. Two such prior art interconnecting schemes are discussed in conjunction with FIGS. 2 and 3. This hierarchical architecture is not always efficient. The single unit used in these systems to provide higher order switching must be large enough to handle some maximum number of modules. This higher order switching is not cost-effective when used with less than this maximum number of modules. The corollary to this is that these systems are not readily expandable beyond the maximum number of modules.

Graded multiple architecture has been used to interconnect lines using modular step-by-step switches in central offices. In such architecture, it is well-recognized that direct links provide efficient coupling for deterministic first offered traffic. Telephony traffic which overflows these direct links represents more random, fluctuating traffic. This overflow traffic is more efficiently handled on shared links (denoted here as a "bus"). Often a combination of a bus for handling overflows along with direct links are employed in distributed architecture. One such prior art system which has been in use many years is shown in FIG. 4.

Another architecture used in data networks employs a plurality of TDM switches in a ring configuration. In this configuration, calls may be routed around the ring through other modules to a particular module. However, if time slots are used in each of the intermediate modules through which the call passes, this results in relatively inefficient use of the TDM switch capacity in each module. Furthermore, if the ring is broken (by the failure of one module), then the remaining operable modules in the ring cannot be used to provide a two-way connection. This architecture is shown to some extent in FIG. 1b.

As will be seen, the present invention discloses an interconnecting architecture of the distributed type which combines characteristics of both the ring and graded multiple architectures. The described architecture is well-suited for interconnecting a plurality of commercially available digital TDM switches or other modules for use in telephony applications. Separate digital intertie hardware is employed which permits calls to be effectively routed through each of the modules without requiring the use of a time slot from within the min TDM bus of each module. Thus, the invention provides a dynamic form of the graded multiple architecture.

SUMMARY OF THE INVENTION

A distributed interconnecting system for use in a time division telephone switching system which employs a plurality of similar switching modules in described. Each of the modules is connected to a plurality of communication lines such as station lines, trunk lines and other lines. The modules, in a well-known manner, concentrate the signals on these lines into time division, digital signals in order that circuit paths may be readily completed between lines. Each of the modules also includes intertie facilities containing an input and output port for permitting the modules to be coupled to other modules. The improved interconnecting system of the present invention provides a plurality of dual ring interties connecting the modules. Each dual ring system is comprised of rings which rotate data in opposite direcions. This dual ring structure is referred to as a "carousel". Each carousel is connected to a module by an intertie unit. These digital intertie units have buffers connected to the intertie paths of the carousel. In addition, each digital intertie unit has buffers connected to the main TDM bus of its respective module. A first coupling means within each intertie unit provides selective transmission between the intertie buffers without requiring use of the main TDM bus of the module. The intertie units also include second coupling means for selectively coupling the intertie buffers to the buffers associated with the TDM bus of its respective module. The invention operates by partitioning the carousel intertie structure as necessary to connect communication lines in different modules by using the shortest partition available given a multiplicity of carousels interconnecting modules.

DETAILED DESCRIPTION OF THE INVENTION

A highly efficient and reliable interconnecting system for interconnecting switching modules with a distributed architecture is described. In the following description, well-known components and techniques are not set forth in detail in order not to obscure the present invention in unnecessary detail.

The present invention, in its presently preferred embodiment, is employed to interconnect a plurality of PBXs. It will be apparent that the described invention may be employed with switching modules other than PBXs. In the presently preferred embodiment, a PBX commercially available from Rolm Corporation of Santa Clara, Calif. is employed and is briefly described in conjunction with FIG. 6. This PBX is generally described in "The New Rolm VLCBX", *Business Communications Review,* March-April, 1979, beginning on page 38. The Rolm PBX is also described, along with a queuing feature which selects between different classes of trunk lines, in copending application Ser. No. 927,185 filed July 24, 1978, entitled "FINITE STORAGE-TIME QUEUE", assigned to the assignee of the present invention. This system comprises a time division multiplexed, computer-controlled private branch exchange, known in the trade as a computerized branch exchange (CBX). Analog signals appearing on trunk interface buffers and telephone set interface buffers are converted into digital signals with well-known pulse code modulated (PCM) digital techniques. Other well-known means are used for error reduction in these digital signals. See U.S. Pat. Nos. 3,877,022 and 3,999,129. Using time division multiplexing, the digital voice signals or other digital data are then switched, permitting connections between the station lines and trunk lines under the control of a central processing unit. These PBXs thus include a plurality of ports permitting coupling with station lines, trunk lines and other lines. Also, these modules for the present invention include digital intertie termination units to permit the PBX to be coupled to other PBXs.

Figure 1A:
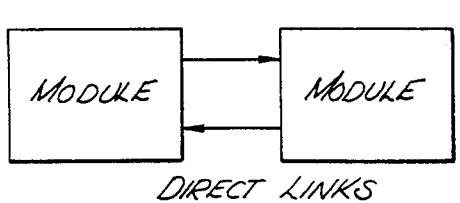
FIG. 1a illustrates a prior art direct link interconnection between switching modules.
Figure 5:
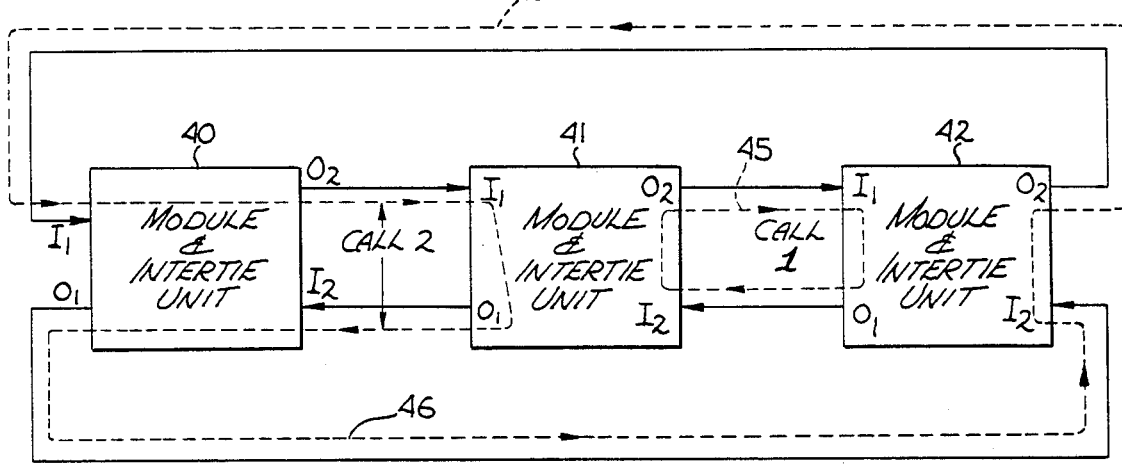
FIG. 5 is a block diagram illustrating the interconnections employed in the present invention for interconnecting modules and their respective intertie units.

Before describing the present invention, a brief discussion of prior art architecture is helpful to appreciate the advantages of the present invention. Two intertie concepts, a direct link and a bus or ring, are commonly employed. As shown in FIG. 1a, the direct link provides a direct connection between two modules. This connection is very cost-efficient when heavily used and is particularly useful where traffic between modules is known and stable. However, with this type of connection, dynamic redistribution to overcome system imbalances among several switching modules is not possible. With the bus or ring, such as the unidirectional links connected in a loop shown in FIG. 1b, loading of the lines is not particularly sensitive to the distribution of the traffic between modules since connections can be made between any two nodes. Unfortunately for this arrangement, many links are required for a single conversation and, moreover, the failure of a single module can interrupt communications between all the modules. (As will be described in greater detail, the carousel-like interconnections of the present invention, as shown in FIG. 5, comprises two rings rotating in opposite directions. This permits dynamic partitioning of carousels. That is, the carousel intertie emulates the behavior of both the links and ring structure described above. More importantly, as will be described, the requirement of the ring of FIG. 1b that calls occupy time slots in each of the modules through which they pass, is eliminated. Intertie units permit calls to be effectively routed through the modules without passing through the TDM bus of the module.)

Figure 2:
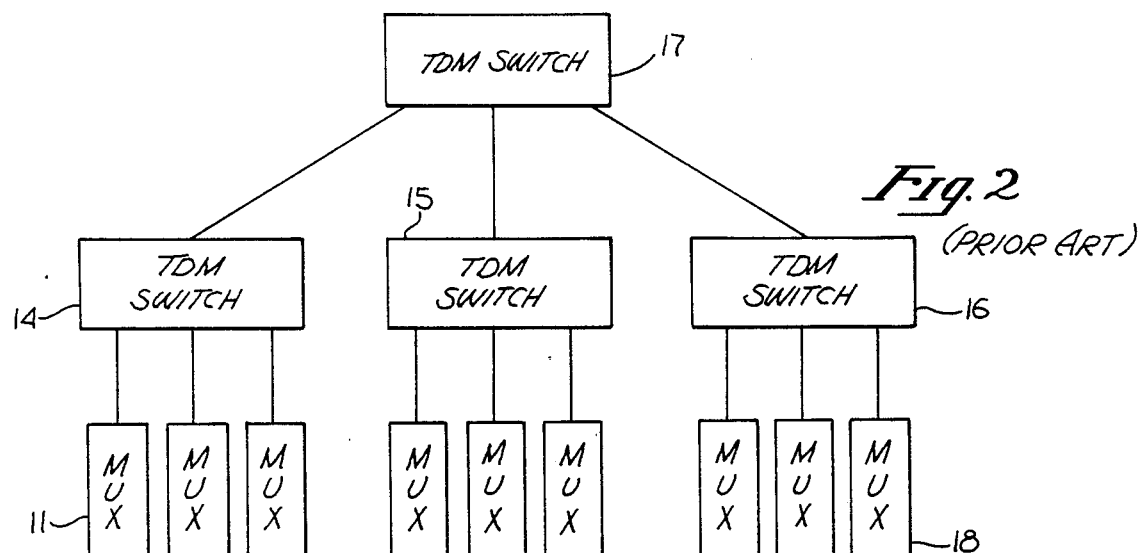
FIG. 2 is a block diagram illustrating one prior art hierarchical interconnecting system.

As mentioned in the prior art section, in order to increase capacity, a plurality of PBXs are often coupled in a hierarchical structure such as shown in FIG. 2. In FIG. 2, a plurality of lines such as station lines and trunk lines 10 are coupled to a multiplexer 11. The multiplexer selects lines in a well-known manner and couples these lines to a time division multiplex (TDM) switch 14. Three multiplexers 11, 12 and 13 are coupled to this single TDM switch 14. Similarly, the TDM switches 15 and 16 each include three multiplexers which in turn are coupled to a plurality of communication lines. Interconnections between multiplexers coupled to the same TDM switch are made through that TDM switch. For example, an interconnection between lines coupled to the multiplexers 11 and 13 is made through the TDM switch 14. Obviously, some means must be provided for interconnecting lines associated with different TDM switches. A higher order switch is required, for example, to interconnect a line connected to the multiplexer 11 with a line connected to the multiplexer 18. A higher order time division multiplex switch 17, which is coupled to each of the switches 14, 15 and 16, is used in this hierarchical architecture. It is apparent that the switch 17 must have the capacity to handle the maximum number of lower level switches which may be coupled to it. Thus, if the switch 17 has the capacity to handle six lower level TDM switches, half its capacity is unused when only three lower level switches, such as shown in FIG. 2, are used. Similarly, if the switch 17 is sized to handle three lower level switches, the system may not readily be expanded to handle more lower level TDM switches unless an even higher level TDM switch is used. Thus, this system is not easily expanded and, moreover, unless the maximum capacity of the highest order switch is used, costly hardware remains idle.

Figure 3:
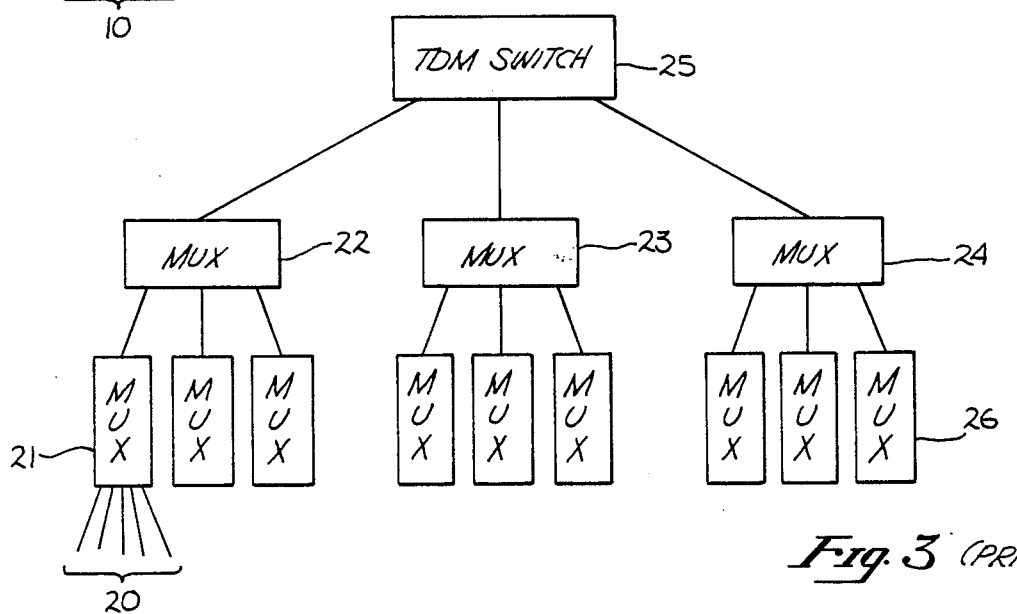
FIG. 3 is a block diagram illustrating another prior art hierarchical interconnecting system.

In FIG. 3, another commercially employed hierarchical architecture is shown. Again, a plurality of multiplexers, such as multiplexer 21, is used to select a plurality of lines 20. Three such multiplexers are coupled to a higher level multiplexer 22. The multiplexers 22, 23 and 24 are interconnected through TDM switch 25. Thus, for this particular architecture, switching does not occur within the multiplexers 22, 23 and 24 but rather only in the TDM switch 25. To connect a line from multiplexer 21 to one associated with multiplexer 26 requires coupling through multiplexer 22, switch 25 and multiplexer 24. This architecture has the same shortcomings as the architecture of FIG. 2. That is, unless the TDM switch is used to its maximum design capacity, the system is inefficient.

Figure 4:
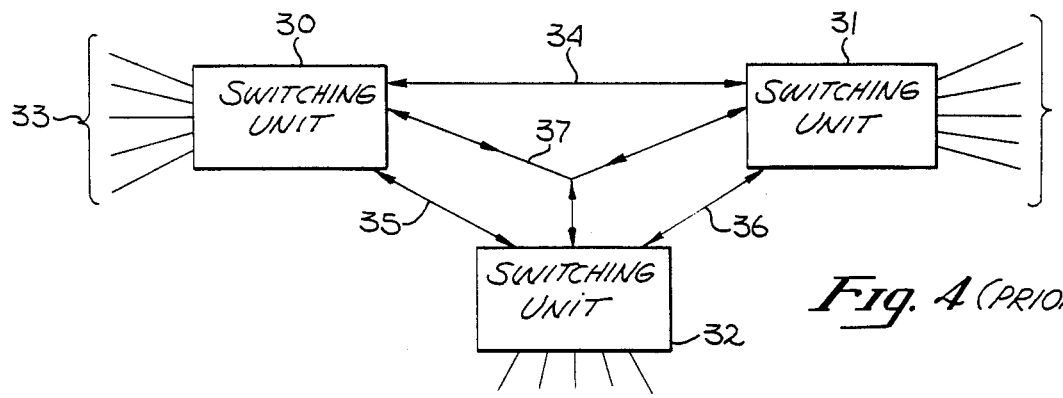
FIG. 4 is a block diagram illustrating a prior art interconnecting system employing a distributed architecture.

For many years, particularly in central offices, a distributed architecture, referred to as "graded multiples", as oppposed to the hierarchical architecture of FIGS. 2 and 3, has been employed, such as shown in FIG. 4. Three switching units 30, 31 and 32 are shown in FIG. 4; each of these switching units is coupled to a plurality of communication lines such as lines 33. The switching units are interconnected by direct links; for example, link 34 interconnects switching units 30 and 31 and, similarly, links 35 and 36 interconnect unit 32 with units 30 and 31, respectively. These direct links provide very efficient hardware utilization, particularly when the traffic between each of the units is determinable. However, if only direct links were used, fluctuations between units, as is the case with typical telephone communications, will occur requiring the addition of a large number of direct links to handle such fluctuations.

To avoid the large number of direct links which would be required when an overflow occurs on any of the direct links, the bus 37 is employed. Obviously the bus 37 does not provide as efficient coupling as the direct links, since it requires ports in all of the switching units. For example, if the bus 37 is handling an overflow between the units 30 and 32, the corresponding ports on the bus coupled to the switching unit 31 remain unused. However, the bus uses fewer ports than would be required using direct links to achieve the same capacity between any two modules. The overflow of telephony traffic from direct links is statistically subject to bursts of traffic. The effect in a graded multiple design is to interleave such overflow on the bus, providing higher utilization of the bus.

The distributed architecture of FIG. 4 may be more readily expanded than the hierarchical structure of FIGS. 2 and 3. The particular distributed architecture of FIG. 4, however, has certain technological disadvantages, particularly when used to interconnect commercially available PBXs.

Figure 6:
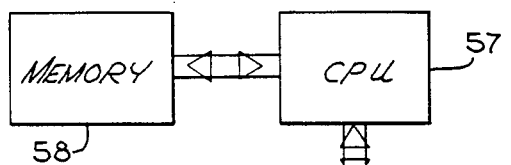
FIG. 6 is a block diagram of a switching module (specifically a computer-controlled PBX) and its interconnection with an intertie unit.
Figure 6:
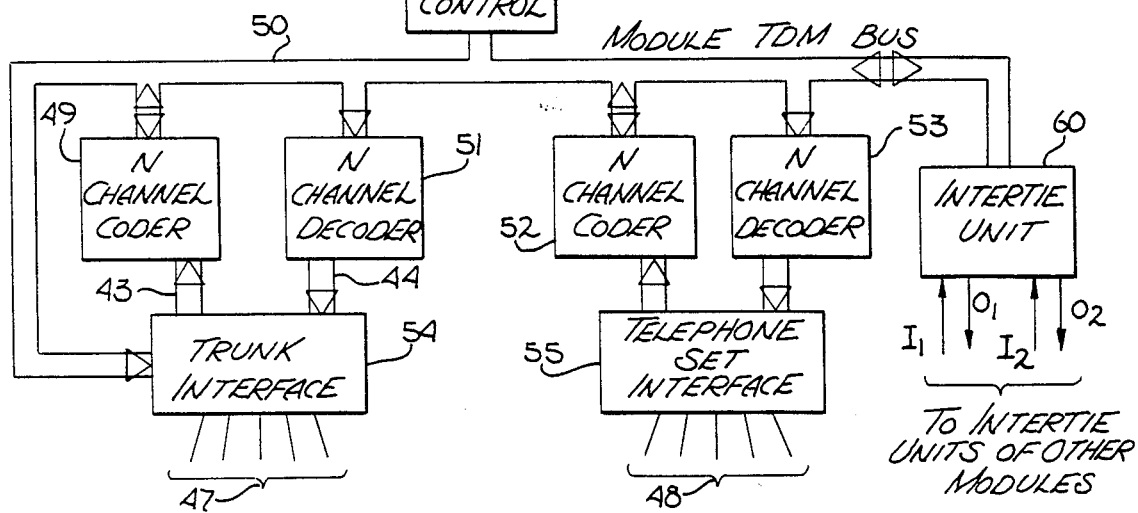

Referring now to FIG. 6, this FIGURE illustrates a computer-controlled telephone switching system and is the switching module employed in the presently preferred embodiment of the invention. As may be seen, a central processing unit 57 under the control of a program stored in the memory 58 controls the switching interconnections between a plurality of trunk lines 47 and a plurality of lines 48 connected to telephone sets via a digital network, specifically TDM network control means 56 and a module TDM bus 50. Each trunk line 47 is coupled through a trunk interface unit 54 and a pair of multiconductor paths 43 and 44 to a coder 49 and a decoder 51. Similarly, each of the lines 48 is coupled through the telephone set interface 55 through multipath conductors to the coder 52 and decoder 53.

While the present invention may be employed with a plurality of different modules, the module of FIG. 6 comprises a time division multiplexed computer-controlled private branch exchange, known in the trade as a computerized branch exchange (CBX). In this module, analog signals appearing at trunk interface 54 and telephone set interface 55 are converted to digital signals by coders 49 and 52, respectively. These signals are routed in digital form to an appropriate decoder 51 or 53 where the digital sigals are converted back to analog form and coupled through the trunk interface or telephone set interface to an appropriate one of the lines 47 or 48, all under the control of the TDM network control means 56. The control means 56 is, in turn, controlled by the CPU 57 in accordance with the program stored in the memory 58.

The module TDM bus 50 provides multiconductor paths for both digital information signals (e.g., voice signals from lines 48); multidigit address signals identifying specific trunk lines; and timing and control signals for directing sequential operation of the interface units 54 and 55, coders 49 and 52, and the decoders 51 and 53.

The operation of the module, specifically the PBX of FIG. 6, is well-known, as is its construction. For this reason and the fact that a detailed discussion of the module is not necessary for an understanding of the present invention, a detailed description of this module is not set forth herein.

For purposes of the present invention, however, the module TDM bus 50 is interconnected to an intertie unit 60. This intertie unit is used to interconnect the module with other modules. The intertie unit 60 includes the input ports $I_1$ and $I_2$ for coupling to output ports of other intertie units and the output ports $O_1$ and $O_2$ for coupling to the input ports of other intertie units. In general, the intertie unit 60 includes first switching means for routing signals between the input port $I_1$ and the output port $O_2$, and between the input port $I_2$ and the output port $O_1$. These interconnections are made without coupling through the module TDM bus 50. The intertie unit 60 includes second switching means which permit signals to be routed from the intertie ports to the module TDM bus.

Figure 7:
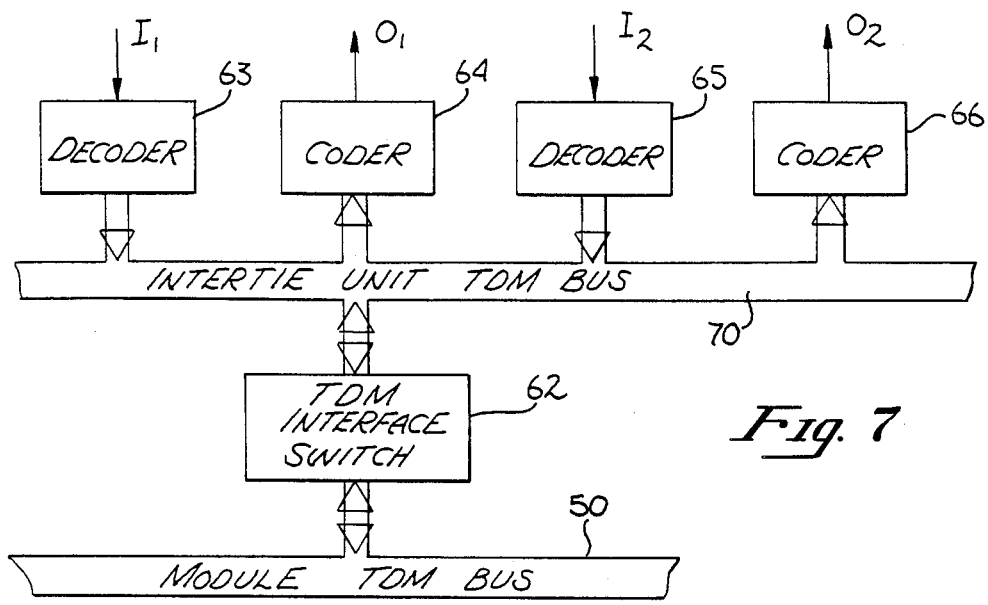
FIG. 7 is a general block diagram of an intertie unit employing an intertie TDM bus.

One embodiment of the intertie unit 60 of FIG. 6 is shown in FIG. 7 and includes a time division multiplexed switch. Thus the unit 60 includes a separate intertie unit TDM bus 70 which is separate and apart from the module TDM bus 50. The intertie ports $I_1$ and $I_2$ communicate with the bus 70 through the decoders 63 and 65, respectively. The output ports $O_1$ and $O_2$ communicate with the bus 70 through the coders 64 and 66, respectively. The module TDM bus 50 communicates with the intertie unit TDM bus 70 through a TDM interface switch 62. The unit of FIG. 7 may be constructed employing well-known TDM components such as the components employed in the PBX of FIG. 6.

Through the bus 70, signals at the port $I_1$ may be directly routed to the port $O_2$ without requiring use of time slots on the bus 50. Also, calls received at the port $I_2$ may be routed to the port $O_1$ through bus 70, again without requiring time slots on the bus 50. The ports $I_1$, $I_2$ and $O_1$, $O_2$ may communicate with the module TDM bus 50 through the switch 62 in a well-known manner.

Figure 8:
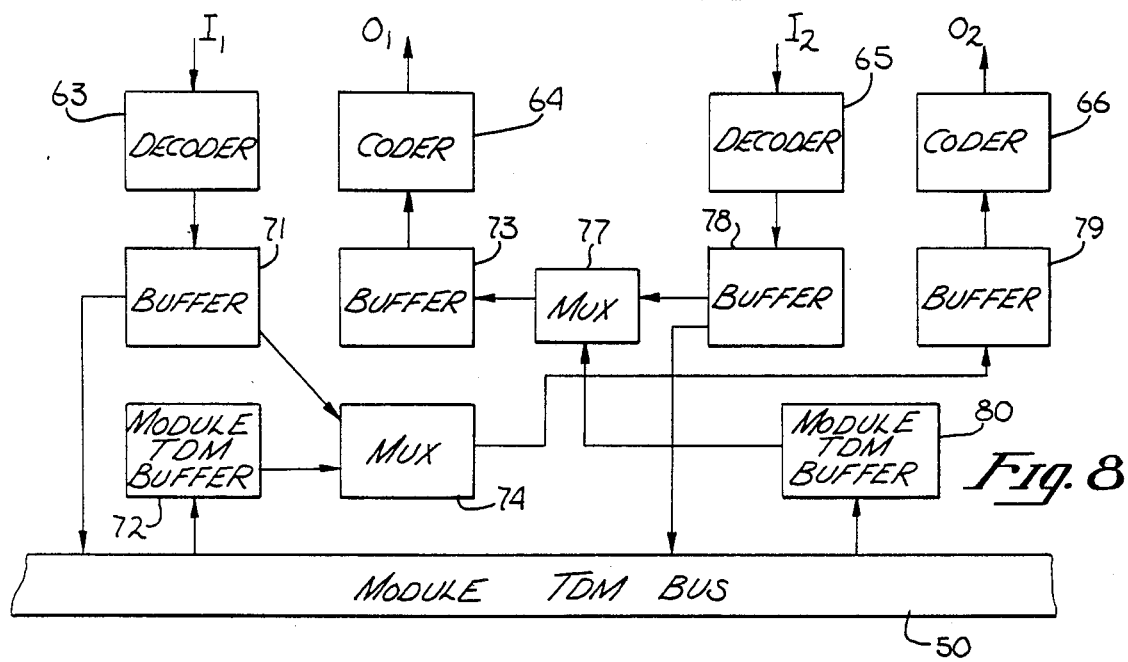
FIG. 8 is a block diagram of an intertie unit employing multiplexers.

Referring now to the presently preferred embodiment of the intertie unit as shown in FIG. 8, the unit is again coupled to a module TDM bus 50. The intertie ports $I_1$ and $I_2$ are coupled to decoders 63 and 65, respectively, and the output ports $O_1$ and $O_2$ are again coupled to the coders 64 and 66, respectively. The signals from the decoder 63 are routed to a buffer 71. The buffer 71 communicates with the bus 50 and also has a path to the multiplexer 74. Signals from the bus 50 may be coupled to the module TDM buffer 72. This buffer provides another input to the multiplexer 74. The multiplexer 74, which may be an ordinary digital multiplexer, selects the contents from either the buffers 71 or 72 and couples these selected signals to the buffer 79. The buffer 79 is, in turn, coupled through the coder 66 to the output port $O_2$. The signals from the decoder 65 are coupled to the buffer 78 and from there may be coupled either to the bus 50 or to the multiplexer 77. The multiplexer 77 also receives an input from the buffer 80 which is coupled to receive signals from the bus 50. The multiplexer 77 may select the contents of either the buffers 78 or 80 and couples the selected signals through the buffer 73 and coder 64 to the output port $O_1$.

In operation, assume that a call is received at the port $I_1$. This call may be routed either to the bus 50 (through buffer 71) or to the output port $O_2$ (through buffer 71, multiplexer 74 and buffer 79). Similarly, calls received at the input port $I_2$ may be routed either to the bus 50 or the output port $O_1$. Signals from the bus 50 may be coupled to the output port $O_1$ through the buffer 80, multiplexer 77 and buffer 73. Similarly, calls from the bus 50 may be routed to the output port $O_2$ through the buffer 72, multiplexer 74 and buffer 79. It should be noted that the calls routed between the ports $I_1$ and $O_2$ and between the ports $I_2$ and $O_1$ do not pass along the bus 50 and thus do not require time slots on this TDM bus. The intertie unit of FIG. 8 may be constructed from well-known digital buffers, multiplexers and coders and decoders.

The buffers and other lines of the above-described intertie unit may have the capacity to handle a single digital word, in the presently preferred embodiment, each buffer provides storage for eight digital words. The reason for this is that, as currently implemented, time division multiplexing (eight time slots) is employed on the interconnecting lines between the intertie units.

Referring again to FIG. 5, three modules such as the module of FIG. 6 with their intertie units such as unit 60 of FIG. 6 are shown as module and intertie units 40, 41 and 42. In the carousel interconnecting arrangement used between the modules, the output port $O_2$ of each of the modules is coupled to the input port $I_1$ of the next module with the output port $O_2$ of the last module 42 being coupled to the input port $I_1$ of the first module 40. Similarly, the output ports $O_1$ are coupled to the input ports $I_2$ of the next module with the output port $O_1$ of the first module being coupled to the input port $I_2$ of the last module. As is apparent, two buses rotating in opposite directions result.

In general, in the presently preferred embodiment all the CPUs 57 of FIG. 6 are coupled to a common hub providing common channel interface signaling. This is in contrast to a system employing a master CPU which controls the CPUs in each of the modules. Through use of the hub, race conditions are avoided. The lines interconnecting each of the modules consists of a bus for handling 16 bits. Twelve (12) of these bits are used for the converted analog signals and four (4) bits are used to indicate channel availability. The status of the path through a switching module is determined by having an idle coder on the originating end sent out of the originating modules ID over the idle channel. Switching modules can then break into idle links and sample the furthest idle module. Comparing this to the internalized system architecture, either module can tell whether or not a connection extends far enough in either direction. A module's own ID on the intertie connections indicates it is completely idle. After verification, a module can seize a link through commands to the control hub. This approach has the advantage of keeping status information dynamically updated. Furthermore, if in the seizure control sequence, the terminating module were to request to break-in, then path verification with a terminating module's ID can be made. The seizing module would notify intermediate modules that the channel was now inactive, and upon release that it is inactive.

A hierarchical fixed routing table for searching for the intertie connections between modules is employed. The lowest entry in the table which represents most of the traffic flow will be effectively direct links, for example Call 1 shown by dotted line 45 between the modules 41 and 42 of FIG. 5. In addition, the status of each terminating channel in a given module will be stored in the module containing the channel. How far the channel activity extends around the carousel can be dynamically determined or verified at the time of the desired seizure as described. The hierarchical approach to routing assures the lowest paths to make a connection. When a call lower in the hierarchy disconnects, it provides a hole which is filled by shifting down calls located at higher levels. The value of dynamic rearranging calls to fill such holes is substantial.

For example, assume that all the direct links between the modules 41 and 42 as shown by dotted line 45 are busy. Additional calls are routed between the modules 42 and 41 through the module 40 as indicated by the dotted lines 46. When it is determined that links indicated by the dotted line 45 are available, calls are rerouted through this direct link and removed from the longer routing. This dynamic rerouting frees the direct links between the modules 40 and 42, and 40 and 41. It is significant to note that when the call is routed from module 42 to 41 as indicated by the dotted lines 46, that is, through the module 40, the TDM bus within module 40 is not required.

Thus the described intertie structure provides standardized hardware for each module capable of creating links, buses or rings. In addition, when connected in the carousel architecture the carousel can be dynamically partitioned to effectively create direct linked paths, tandem linked paths, through intertieing modules without using time slots within the modules.

Figure 1B:
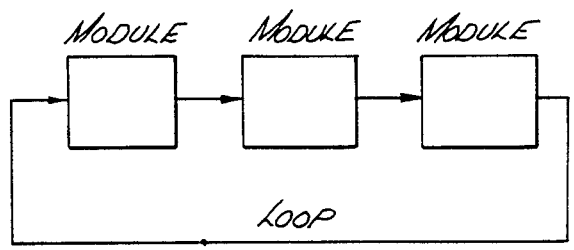
FIG. 1b illustrates a prior art ring connection between switching modules.

Another important feature of the intertie arrangement of the present invention is that is provides more reliable interconnections, particularly when compared to a standard ring architecture. Assume that the module 40 along with its intertie units are inoperative. Even in this case, direct links exist between modules 41 and 42. Note that in a typical unidirectional ring arrangement such as shown in FIG. 1b, if any one of the modules becomes inoperative, all communications from module-to-module are lost. Even with the hierarchical architecture of FIGS. 2 and 3, malfunctions in the higher order TDM switches can disrupt all inter-module communications.

Figure 9:
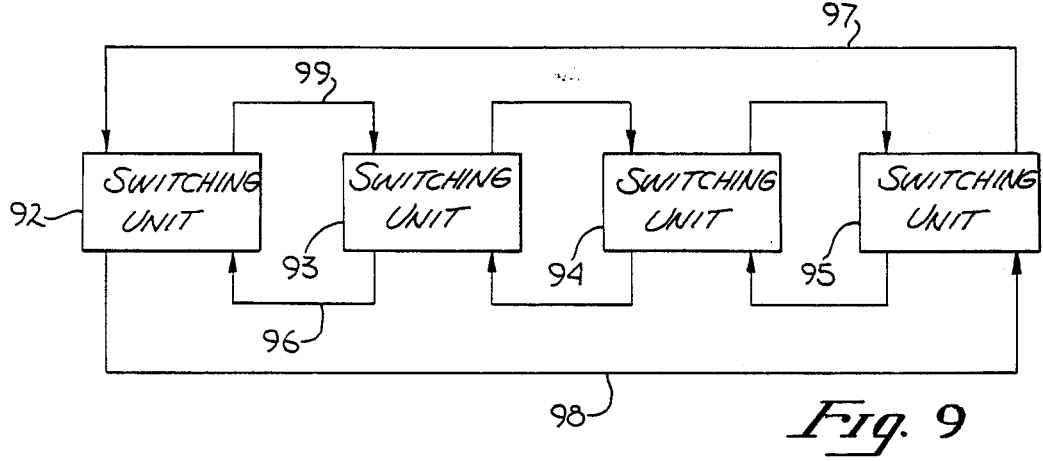
FIG. 9 is a block diagram illustrating the carousel interconnections of FIG. 5 where four switching modules and their respective intertie units are employed.

The interconnection system of the present invention has particular advantage when used with three switching modules as shown in FIG. 9. With three modules, direct links exist between each of the modules. The same principle, however, may be applied to any number of switching modules. In FIG. 9, switching modules and their intertie units are shown as switching units. That is, for example, the switching module (PBX) of FIG. 6 along with the intertie unit 60 are shown as the switching unit 92 in FIG. 9. Four switching units 92, 93, 94 and 95 are illustrated in this figure. The units are coupled in the same carousel manner as the units of FIG. 5. For example, one input port of the unit 92 is coupled to an input port of the unit 93 through line 99, and one output port of the unit 93 is coupled to one input port of the unit 92 via line 96. The other output port of unit 92 is coupled to an output port of the unit 95 via line 97. Units 93 and 94, and 94 and 95, are coupled in a similar manner.

While direct links exist between units 92 and 93, units 94 and 95, and units 95 and 92, direct links do not exist between units 92 and 94, units 93 and 95, and units 92 and 94. Some direct links between units are lost when more than three units are used. However, in these cases, two paths exist through the intertie units associated with each of the units, again without employing time slots within the modules. For example, consider the possible paths between units 92 and 94. A connection may be made through unit 93; another connection may be made through unit 95.

While only the case of three and four switching modules has been shown above, it will be obvious to one skilled in the art that the principle of the present invention may be extended to any greater number of modules. Also it will be apparent that the intertie units may be realized in many different configurations.

Comparing for a moment the interconnecting systems of FIGS. 5 and 9 with the prior art system of FIG. 4, it should be noted that, in effect, the lines between the modules and intertie units 40, 41 and 42 serve the function of both direct links and the function of bus 37 of FIG. 4 in that they are used for overflow. However, unlike the arrangement of FIG. 4, the unusable ports associated with the bus 37 do not exist.

Thus, an interconnecting system for interconnecting modules has been described. The system employs a general distributed architecture which permits effective routing of signals through modules without utilizing time slots within the modules. Intertie units are employed which permit signals to be routed in a carousel or ring-like fashion. The invented system provides a highly reliable and cost-effective interconnecting architecture for time division multiplexed communication systems.

I claim:

1. In a time division telphone switching system employing a plurality of switching modules, each of said modules interconnecting with a plurality of communication lines such as station lines and trunk lines, said modules for concentrating signals on said lines into time division multiplex digital signals and for switching said signals between said lines, an improved interconnecting system for interconnecting said modules comprising:
 a plurality of intertie units, one for each of said modules, each of said units having a first and second intertie input port for receiving signals from other units and a first and second intertie output port for communicating signals to other of said units, each of said units being coupled to receive and communicate signals to its respective switching module;
 first interconnecting lines for interconnecting said second output port of said first of said units to said first input port of the second of said units and for connecting said second output port of said second of said units to said first input port of said third of said units, and for connecting the second output port of the last of said units to said first input port of said first unit;
 second interconnecting lines for connecting said second input port of said first unit to said first output port of said second unit and for connecting said second input port of said second unit to said first output port of said third unit, and for connecting said second input port of said last unit to said first output port of said first unit;
 whereby efficient and reliable interconnections between said modules is realized.

2. In a time division telephone switching system employing a plurality of switching modules, each of said modules interconnecting with a plurality of communication lines such as station lines and trunk lines, said modules for concentrating signals on said lines into time division multiplex digital signals and for switching said signals between said lines, an improved interconnecting system for interconnecting said modules comprising:
 a plurality of intertie units, one for each of said modules, each of said units having a first and second intertie input port for receiving signals from other units and a first and second intertie output port for communicating signals to other of said units, each of said units being coupled to receive and communicate signals to its respective switching module, each unit including:
  first switching means for switching signals from said first input port to one of said second output port and said module, said connection between said first input port and said second output port being made without coupling through said module, and for coupling said module to said first input and output ports, and
  second switching means for switching signals from said second input port to one of said first output port and said module, said connection between said second input port and said first output port being made without coupling through said module, and for coupling said module to said second input and output ports;
 first interconnecting lines for interconnecting said second output port of the first of said units to said first input port of the second of said units and for connecting said second output port of said second unit to said first input port of said third unit, and for connecting the second output port of the last of said units to said first input port of said first unit;
 second interconnecting lines for connecting said second input port of said first unit to said first output port of said second unit and for connecting said second input port of said second unit to said first output port of said third unit, and for connecting said second input port of said last unit to said first output port of said first unit;
 whereby efficient and reliable interconnections between said modules is realized.

3. The interconnecting system defined by claim 2 wherein said first and second switching means of each of said intertie units includes a time division multiplexed bus coupled to said first and second input and output ports, and coupled to said switching module.

4. The interconnecting system defined by claim 3 wherein said bus of said each of said intertie unit is coupled to a time division multiplexed bus of its respective switching module.

5. The interconnecting system defined by claim 2 wherein said first switching means of each of said switching modules includes a first multiplexer for said signal switching from said first input port to one of said second output port and said module.

6. The interconnecting system defined by claim 5 wherein said first multiplexer provides said signal switching to a time division multiplexed bus of its respective switching module.

7. The interconnecting system defined by claim 6 wherein said second switching means of each of said switching modules includes a second multiplexer for said signal switching from said second input port to one of said first output port and said module.

8. The interconnecting system defined by claim 7 wherein second multiplexer provides said signal switching to said time divison multiplexed bus of its respective switching module.

* * * * *